(12) United States Patent
Jeong et al.

(10) Patent No.: US 12,430,557 B2
(45) Date of Patent: Sep. 30, 2025

(54) EFFECTIVE NETWORK COMPRESSION USING SIMULATION-GUIDED ITERATIVE PRUNING

(71) Applicant: NOTA, INC., Daejeon (KR)

(72) Inventors: Dae-Woong Jeong, Daejeon (KR); Jaehun Kim, Seoul (KR); Young Seok Kim, Seoul (KR); Myungsu Chae, Daejeon (KR)

(73) Assignee: NOTA, INC., Daejeon (KR)

( * ) Notice: Subject to any disclaimer, the term of this patent is extended or adjusted under 35 U.S.C. 154(b) by 1022 days.

(21) Appl. No.: 17/290,107

(22) PCT Filed: Dec. 13, 2018

(86) PCT No.: PCT/KR2018/015831
§ 371 (c)(1),
(2) Date: Apr. 29, 2021

(87) PCT Pub. No.: WO2020/091139
PCT Pub. Date: May 7, 2020

(65) Prior Publication Data
US 2021/0397962 A1    Dec. 23, 2021

(30) Foreign Application Priority Data

Oct. 31, 2018  (KR) .................... 10-2018-0131655
Dec. 7, 2018   (KR) .................... 10-2018-0156750

(51) Int. Cl.
*G06N 3/082*      (2023.01)
*G06N 3/04*       (2023.01)

(52) U.S. Cl.
CPC ............... *G06N 3/082* (2013.01); *G06N 3/04* (2013.01)

(58) Field of Classification Search
CPC .................................. G06N 3/082; G06N 3/04
See application file for complete search history.

(56) References Cited

U.S. PATENT DOCUMENTS

| | | | |
|---|---|---|---|
| 2017/0337472 A1 | 11/2017 | Durdanovic et al. | |
| 2018/0046915 A1* | 2/2018 | Sun | ........... G06N 3/082 |
| 2018/0114114 A1* | 4/2018 | Molchanov | ........... G06N 3/045 |
| 2018/0373978 A1* | 12/2018 | Yu | ........... G06F 17/11 |

FOREIGN PATENT DOCUMENTS

| | | |
|---|---|---|
| KR | 10-2018-0037558 A | 4/2018 |
| KR | 10-2018-0092810 A | 8/2018 |
| WO | WO-2018058509 A1 * 4/2018 | ............... G06N 3/04 |

OTHER PUBLICATIONS

International Search Report mailed Jul. 31, 2019, issued in corresponding International Application No. PCT/KR2018/015831, filed Dec. 13, 2018, 2 pages.
Han, S., et al., "Learning both Weights and Connections for Efficient Neural Networks," NIPS (2015), pp. 1-9.

* cited by examiner

*Primary Examiner* — John T Repsher, III
(74) *Attorney, Agent, or Firm* — CHRISTENSEN O'CONNOR JOHNSON KINDNESS PLLC

(57) ABSTRACT

The effective network compression using simulation-guided iterative pruning according to various embodiments, can be configured so that, by means of an electronic device, a first neural network is pruned on the basis of a threshold value, a second neural network is generated, a gradient for each weighted value of the second neural network is calculated, and a third neural is acquired by applying the gradient to the first neural network.

6 Claims, 5 Drawing Sheets

FIG. 2

```
Input: Pre-trained neural network model M, Pruning steps n, Threshold value (pruning ratio) r
    Simulation steps s Output: Reduced network R Reset zero position matrix Z
M₁ = M_pstep
While pruning step < n,
    While simulation step < s,
        Generating temporarily reduced network T by pruning in M_pstep by using threshold value r
        For weighted values of M_pstep, calculating gradient g by using T
            If location of weighted value does not correspond to Z,
            Update weighted values of Mpstep by using g Store weighted values M_pstep of by using r
    M_{pstep+1} = M_pstep
    R = M_n
```

EFFECTIVE NETWORK COMPRESSION USING SIMULATION-GUIDED ITERATIVE PRUNING

TECHNICAL FIELD

The various example embodiments relate to effective network compression using simulation-guided iterative pruning.

BACKGROUND ART

A development of a deep neural network is a major contributor to the recent popularity of artificial intelligence. Most algorithms showing state of the art performance in various fields are based on the deep neural network. However, due to complex and large-scale network structure, it is difficult to use the deep neural network without using high-end computing. To supply computing power, since most of the existing products based on the deep neural network are processed in a high-end server, there are three important limitations such as latency time issues, network costs, and privacy issues. Therefore, it needs to use the deep neural network in independent clients, not in a server. To achieve this, a network compression technology is very important.

Research for network compression has been intensively performed through various approaches. Also, among network compression methods, an iterative pruning is one of the most popular methods that have proven to be effective in several previous studies, including state of the art methods. In an iterative pruning process, first, importance of weighted values is estimated in an original network, and then, the weighted values having low importance are removed by retraining the rest weighted values through fine adjustment. Such pruning process is iteratively performed until a stop condition is met.

DETAILED DESCRIPTION OF THE INVENTION

Technical Problem

However, in such process, since the importance is determined based on the original network, it may be sufficiently important in the network in which the pruned weighted values are organized. Therefore, in the various example embodiments, based on simulation of a reduced network, a more efficient and sophisticated pruning method is proposed.

Technical Solution

According to an example of embodiments of the present invention, a simulation-guided iterative pruning method for effective network compression may include generating a second neural network by pruning a first neural network based on a threshold value, calculating a gradient for each weighted value of the second neural network, and acquiring a third neural network by applying the gradient to the first neural network.

According to an example of embodiments of the present invention, an electronic device performing simulation-guided iterative pruning for effective network compression may include a memory storing weighted values of an original network to be compressed, and a processor configured to compress the original network. According to an example of embodiments of the present invention, the processor may be configured to generate a second neural network by pruning a first neural network based on a threshold value, calculate a gradient for each weighted value of the second neural network, and acquire a third neural network by applying the gradient to the first neural network.

Advantageous Effects of the Invention

According to various example embodiments, a new method for compressing a deep neural network is proposed. Through a simulation of a temporarily reduced network, iterative pruning may be performed more effectively. Simultaneously, optimal weighted values may be collaboratively learned with a more suitable structure to the reduced network. Therefore, it is possible to install a high-performance deep learning model in an embedded system that uses limited resources.

BRIEF DESCRIPTION OF THE DRAWINGS

FIG. 2 is a drawing for describing an operation algorithm of an electronic device performing simulation-guided iterative pruning according to example embodiments of the present invention.

BEST MODE FOR CARRYING OUT THE INVENTION

Hereinafter, embodiments of the present invention will be described in detail with reference to the accompanying drawings. In describing example embodiments, if it is determined that detailed descriptions for related known function or elements may unnecessarily cloud the main point of the present invention, the detailed descriptions may be omitted. Also, the terminologies used herein are terminologies defined by considering and may vary based on a reader, the intent of an operator, or custom of a field to which this disclosure belongs, and the like.

According to various example embodiments of the present invention, simulation-guided iterative pruning for effective network compression is proposed.

Figure 1:
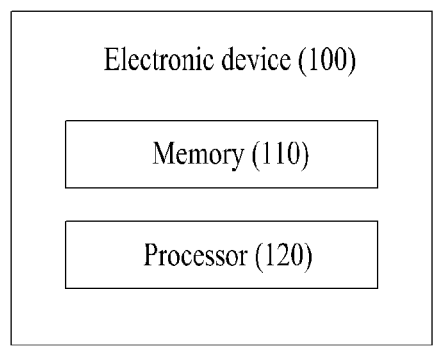
FIG. 1 is a block diagram of an electronic device performing simulation-guided iterative pruning according to example embodiments of the present invention.
Figure 3:
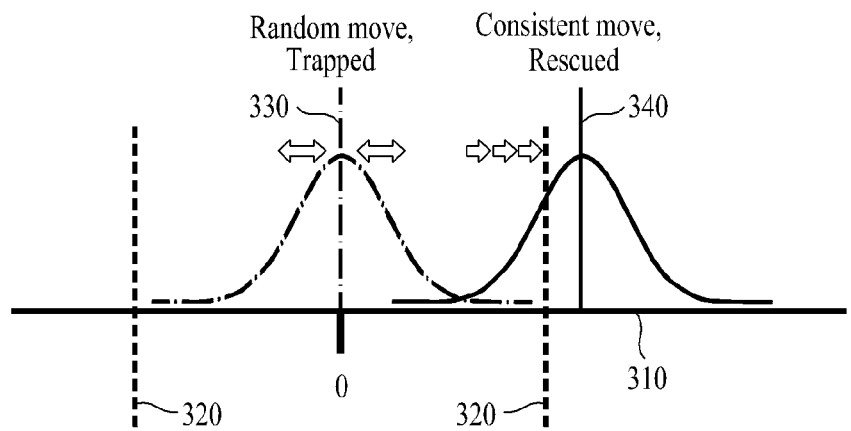
FIG. 3 is a drawing for conceptually describing simulation-guided iterative pruning according to example embodiments of the present invention.

FIG. 1 is a block diagram of an electronic device performing simulation-guided iterative pruning according to example embodiments of the present invention. FIG. 2 is a drawing for describing an operation algorithm of an electronic device performing simulation-guided iterative pruning according to example embodiments of the present invention. FIG. 3 is a drawing for conceptually describing simulation-guided iterative pruning according to example embodiments of the present invention.

Referring to FIG. 1, an electronic device 100 according to example embodiments may include a memory 110 and a processor 120 as elements. In some embodiments, the electronic device 100 may further include at least another element. According to various example embodiments, the electronic device 100 may be configured to use a deep neural network, and may perform a simulation-guided iterative pruning process.

The memory 110 may store various data used by the elements of the electronic device 100. For example, the data may include an input data or output data for software (e.g. program) and instructions related thereto. The memory 100 may include volatile memory or nonvolatile memory.

The processor 120 may perform various data processes and operations. For this, the processor 120 may control at least another element of the electronic device 100 connected to the processor 120. Also, the processor 120 may perform various data processes and operations by running software, and may store result data in the memory 110.

According to various example embodiments, as shown in FIG. 2, the electronic device 100 may perform simulation-guided iterative pruning. According to various example embodiments, the electronic device 100 may use a temporarily reduced network for the simulation. As the first step of the simulation, the electronic device 100 may calculate importance of weighted values in an original network, and store it separately in the memory 110. After this, the electronic device 100 may generate the temporarily reduced network by setting the weighted values of the original network having importance below a specific threshold value as zero. Here, threshold values of predetermined percentile are used, so that consistency may be maintained during the iterative simulation process. The electronic device 100 may include the weighted values which are temporarily set as zero, and calculate gradients for each weighted value of the temporarily reduced network by using a series of learning data. The electronic device 100 may apply the gradients to the stored original network, not the temporarily reduced network. Such simulation process may start with the first step, and change the original network, and may be iterated until the network is sufficiently simulated.

Through the simulation process, the importance of weighted values may be calculated, and the weighted values below the threshold value may be removed through iterative pruning. After this, the pruned weighted values may be permanently stationary, and the whole process may be iterated with a high threshold value without retraining process.

According to various example embodiments, the electronic device 100 may perform simulation-guided iterative pruning based on the gradients of weighted values, as shown in FIG. 3. X-axis 310 corresponds to values of the weighted values, and a first dotted line 320 may indicate a threshold value of pruning. A second dotted line 330 indicates ideal values of the weighted values which is located close to zero, strictly meaningless, and a third dotted line 340 may indicate ideal values of other weighted values which are sufficiently important. Since a learning process of the network uses probabilistically selected data, the ideal values of important weighted values also may be probabilistically distributed around an absolute ideal value. In this case, even if the absolute ideal value of the important weighted values is greater than the threshold value, the values of the weighted values may fall within a cutoff range. The pruning of the fallen weighted values may lead to unnecessary information loss. Therefore, it may be important to distinguish between not important weighted values and important but fallen weighted values. Here, when weighted values are set as zero during the simulation, since the absolute ideal value is close to zero, the gradients of the not important weighted values may have random direction. On the other hand, the gradients of the important weighted values may have consistent direction until the weighted values are obtained through the iterative simulation. Therefore, such screening process is based on the simulation of the pruned network, not the original network, and may enable more sophisticated pruning.

The electronic device 100 performing the simulation-guided iterative pruning for effective network compression according to various example embodiments may include the memory 110 storing the weighted values of the original network to be compressed, and the processor 120 configured to compress the original network.

According to the various example embodiments, the processor 120 may be configured to generate a second neural network by pruning a first neural network based on a threshold value r, calculate a gradient g for each weighted value of the second neural network, and acquire a third neural network by applying the gradient g to the first neural network.

According to various example embodiments, the processor 120 may be configured to set at least one having importance below the threshold value r among weighted values of the first neural network to zero.

According to various example embodiments, the processor 120 may determine the original network to be compressed as the first neural network.

According to various example embodiments, the processor 120 may determine the third neural network as the first neural network, and may be iteratively operated by a set number of times. For example, the set number of times may indicate pruning steps n.

According to various example embodiments, the processor 120 may acquire the third neural network as a compressed network after being repeated by a set number of times.

For example, the first neural network may indicate a pre-trained neural network model Ma, the second neural network may indicate a temporarily reduced network T, and the third neural network may indicate a network Ma+1 reduced through each pruning step or a network R reduced through whole pruning steps.

Figure 4:
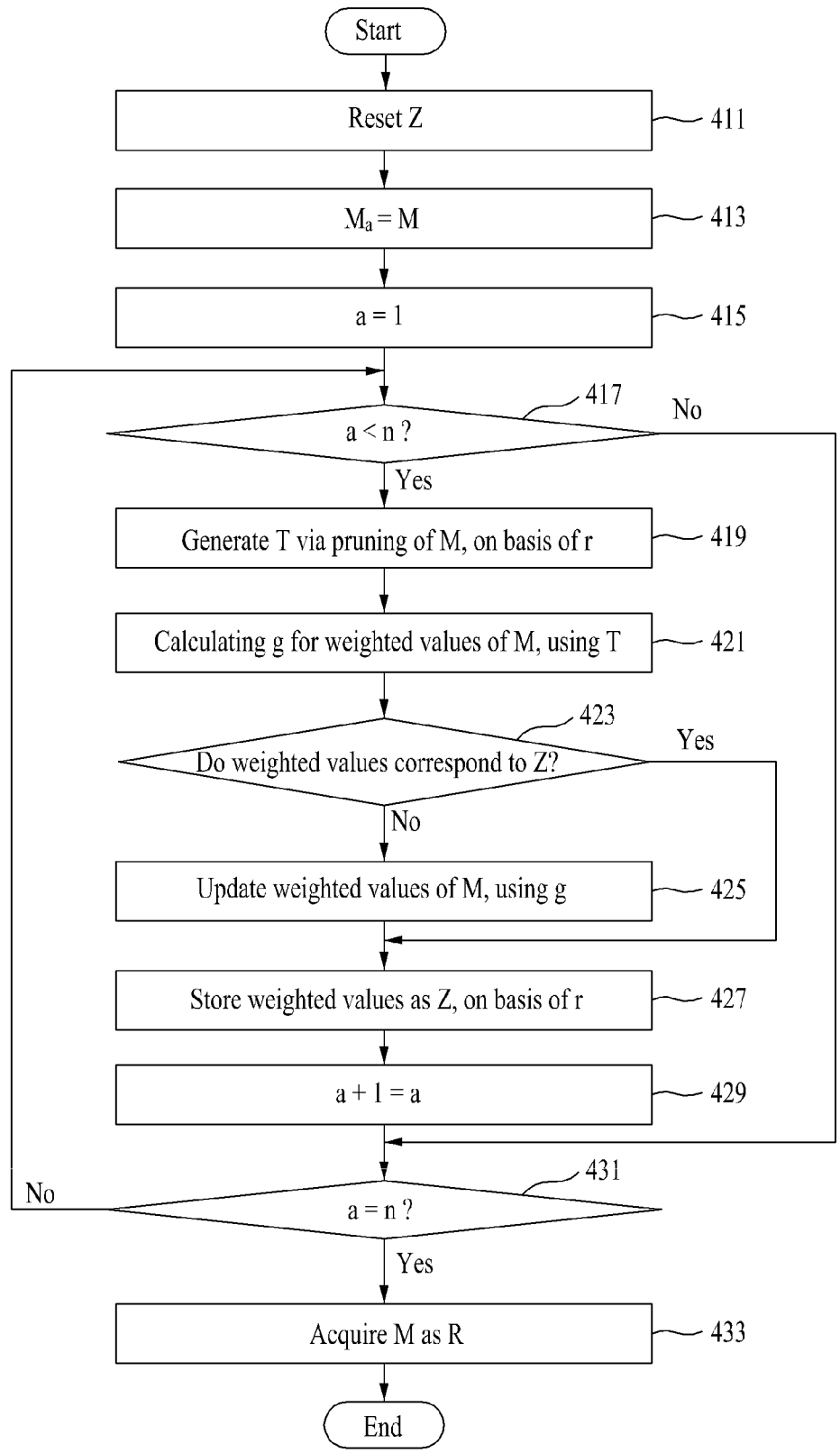
FIG. 4 is a flow chart of a method for performing simulation-guided iterative pruning according to example embodiments of the present invention.

FIG. 4 is a flow chart of a method for performing simulation-guided iterative pruning according to example embodiments of the present invention.

Referring to FIG. 4, the electronic device 100 may reset a zero position matrix Z in Operation 411. The electronic device 100 may store weighted values of an original network in the zero position matrix Z. The electronic device 100 may calculate importance of the weighted values of the original network, and store it in the memory 110. The electronic device 100 may determine a pre-trained neural network model M in Operation 413. For example, the electronic device 100 may determine the pre-trained neural model M based on a pruning step a. The electronic device 100 may set the pruning step a in Operation 415. For example, when performing first pruning for the original network, the electronic device 100 may set the pruning step a as 1, and the pre-trained neural network model M may be the original network.

The electronic device 100 may determine whether the pruning step a reaches to determined pruning steps n in Operation 417. In other words, the electronic device 100 may determine whether the present pruning step a is below the set number of times of the pruning steps n. When it is determined that the pruning step a does not reach to the set pruning steps n in Operation 417, the electronic device 100 may generate the temporarily reduced network T in Operation 419. The electronic device 100 may generate the temporarily reduced network T by performing pruning to the pre-trained neural network model M based on the threshold value (pruning ratio) r. The electronic device 100 may use a predetermined percentile as the threshold value r. Through this, as at least one having importance below the threshold value among weighted values of the pre-trained neural network model M is set to zero, the temporarily reduced network T may be generated. The electronic device 100 may calculate the gradients g for the weighted values for the pre-trained neural network model M by using the temporarily reduced network T in Operation 421.

The electronic device 100 may compare the weighted values with the zero position matrix Z in Operation 423. The electronic device 100 may determine whether the weighted values correspond to the zero position matrix Z. When it is determined that the weighted values do not correspond to the zero position matrix Z in Operation 423, the electronic device 100 may update the weighted values of the pre-trained neural network model M by using the gradients g in Operation 425. In other words, the electronic device 100 may apply the gradients g to the pre-trained neural network model M, not the temporarily reduced network T. After this, the electronic device 100 may store the weighted values to the zero position matrix Z based on the threshold value r in Operation 427. When it is determined that the weighted values correspond to the zero position matrix Z in Operation 423, the electronic device 100 may store the weighted values to the zero position matrix Z based on the threshold value r in Operation 427. Through this, the electronic device 100 may change the original network. The electronic device 100 may change the pruning step a in Operation 429. For example, the electronic device 100 may increase the present pruning step a by 1.

The electronic device 100 may determine whether the pruning step a reaches to the pruning steps n in Operation 431. In other words, the electronic device 100 may determine whether the present pruning step a matches a set number of times of the pruning steps n. For example, the electronic device 100 may perform Operation 431 after changing the pruning step a in Operation 429. Or, when it is determined that the present pruning step a is below the set number of times of the pruning steps n in Operation 417, the electronic device 100 may proceed with Operation 431. Or, when it is determined that the present pruning step a does not match the set number of times of the pruning steps n in Operation 431, the electronic device 100 may proceed with Operation 417. Through this, the electronic device 100 may perform iterative pruning as much as the pruning steps n. Accordingly, the weighted values having low importance may be removed. When it is determined that the pruning step a reaches to the pruning steps n in Operation 431, the electronic device 100 may acquire the pre-trained neural network model M as a reduced network R in Operation 433.

A simulation-guided iterative pruning method for effective network compression according to various example embodiments may include generating a second neural network by pruning a first neural network based on the threshold value r, calculating the gradient g for each weighted values for the second neural network, and acquiring a third neural network by applying the gradient g to the first neural network.

According to various example embodiments, the generating of the second neural network may include setting at least one having importance below the threshold value r among weighted values of the first neural network to zero.

According to various example embodiments, the method may further include determining an original network to be compressed as the first neural network.

According to various example embodiments, the method may further include determining the third neural network as the first neural network, and wherein the method may be repeated by a set number of times. For example, the set number of times may indicate the pruning steps n.

According to various example embodiments, the method may further include acquiring the third neural network as a compressed network after the method is repeated by the set number of times.

For example, the first neural network may indicate the pre-trained neural network model $M_a$, the second neural network may indicate the temporarily reduced network T, and the third neural network may indicate a network $M_{a+1}$ reduced through each pruning step or a network R reduced through the whole pruning steps.

Figure 5:
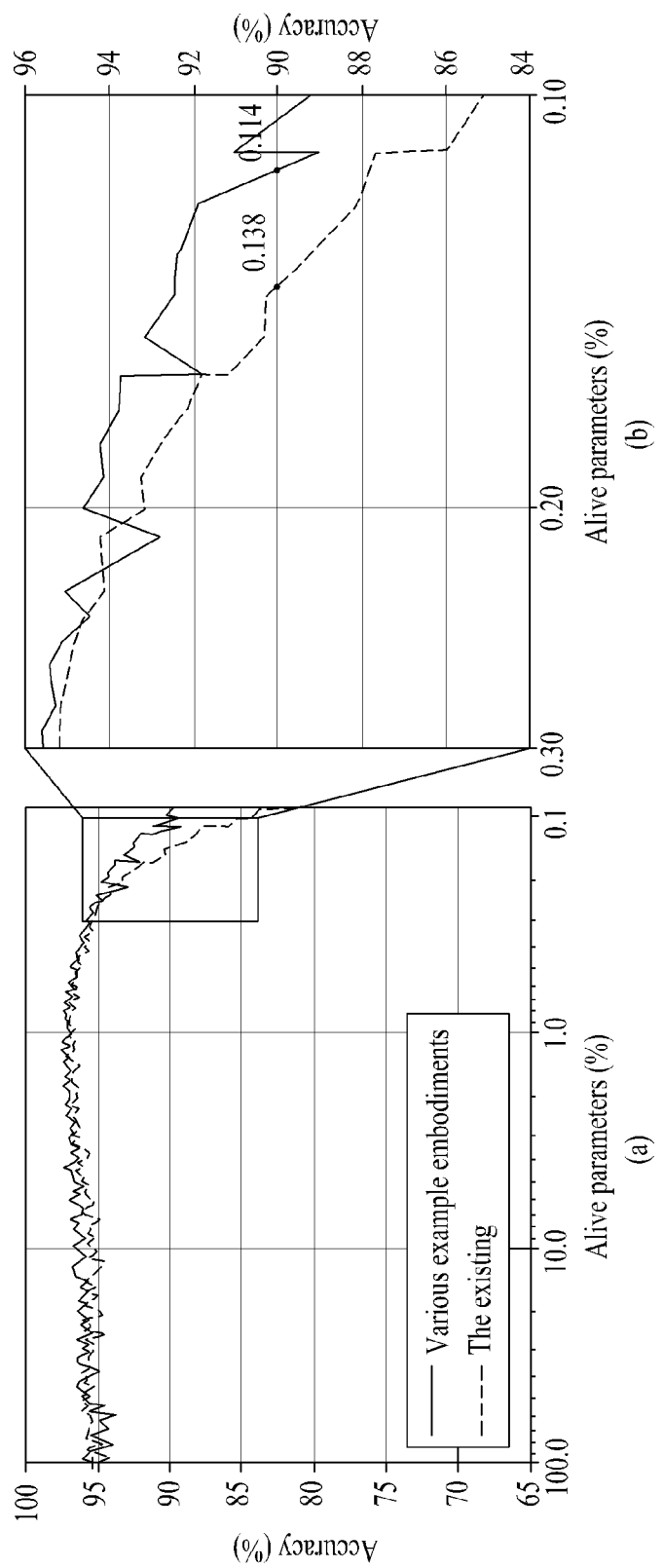
FIG. 5 is a drawing for describing performance of simulation-guided iterative pruning according to example embodiments of the present invention.

FIG. 5 is a drawing for describing performance of simulation-guided iterative pruning according to example embodiments of the present invention. FIG. 5 which is experimental result corresponding to each of an algorithm according to various example embodiments and the existing algorithm indicates classification accuracy as a function of ratio for pruned weighted values which are not removed in the pruning process. (b) of FIG. 5 shows enlarged view of a partial area in which performance difference between the algorithm according to various example embodiments and the existing algorithm is relatively large in (a) of FIG. 5.

Referring to FIG. 5, even if the number of pruned weighted values is reduced to 1%, there is no significant performance difference between the algorithm according to various example embodiments and the existing algorithm. However, as the number of the pruned weighted values is reduced to less than 1%, the performance of the existing algorithm is rapidly degraded, while the performance of the algorithm according to various example embodiments is relatively high. This means that the algorithm according to various example embodiments performs network compression more effectively than the existing algorithm. For example, when using the algorithm according to various example embodiments, the network is compressed to 0.114% of its original size while maintaining the classification accuracy, but when using the existing algorithm, the network may be only compressed to 0.138%.

According to various example embodiments, a new method for compressing a deep neural network is proposed. Through the simulation of the temporarily reduced network, iterative pruning may be performed more effectively. Simultaneously, optimal weighted values may be collaboratively learned with a more suitable structure to the reduced network. This may indicate performance that exceeds the existing algorithm, as the experimental result shown in FIG. 5. Therefore, it is possible to install a high-performance deep learning model in an embedded system that uses limited resources.

Although the embodiments of the present invention are described in detail above, claims of the present invention are not limited thereto, and various modifications and variations of those skilled in the art using the basic concept of the present invention defined in the following claims are included in claims of the present invention.

The invention claimed is:
1. A processor-implemented method for acquiring a compressed network for installation in an embedded system, comprising:

determining a first neural network as a pre-trained neural network model to be pruned;
performing a simulation process to generate the compressed network from the first neural network including steps of:
storing weights of the first neural network in a memory of the electronic device;
generating a second neural network, separate from the stored weights, as a temporarily reduced network for the pre-trained neural network model by setting weights of the first neural network having an importance below a threshold value as zero;
calculating gradients for each weight of the second neural network; and
updating the stored weights of the first neural network being the pre-trained neural network model to be pruned by applying the gradients to the first neural network being the pre-trained neural network model to be pruned such that, among the weights set to zero, an unimportant weight whose gradients have a random direction to be pruned and an important weight whose gradients have a consistent direction not to be pruned are determined;
generating the compressed network by pruning, among the stored weights, the unimportant weight in the first neural network based on the threshold value; and
installing the compressed network in an embedded system.

2. An electronic device for acquiring a compressed network for installation in an embedded system, comprising:
a memory; and
a processor connected to the memory and configured to execute at least one instruction stored in the memory, wherein the processor is configured to:
determine a first neural network as a pre-trained neural network model to be pruned;
perform a simulation process to generate the compressed network from the first neural network including steps of:
storing weights of the first neural network in the memory;
generating a second neural network, separate from the stored weights, as a temporarily reduced network for the pre-trained neural network model by setting weights of the first neural network having an importance below a threshold value as zero,
calculating gradients for each weight of the second neural network, and
updating the stored weights of the first neural network being the pre-trained neural network model to be pruned by applying the gradients to the first neural network being the pre-trained neural network model to be pruned such that, among the weights set to zero, an unimportant weight whose gradients have a random direction to be pruned and an important weight whose gradients have a consistent direction not to be pruned are determined;
generate the compressed network by pruning, among the stored weights, the unimportant weight in the first neural network based on the threshold value; and
install the compressed network in an embedded system.

3. The method of claim 1, wherein the compressed network is less than 1% of the size of the first neural network.

4. The electronic device of claim 2, wherein the compressed network is less than 1% of the size of the first neural network.

5. The method of claim 1, wherein the determining, the performing, and the generating constitute a cycle for acquiring the compressed network, the cycle is repeated for a set number of times after the compressed network generated in a previous cycle is set to the first neural network in the determining in a next cycle, and the pruned weight in the cycle is stored in a zero-position matrix and remains permanently stationary.

6. The method of claim 1, wherein the updating comprises:
determining whether the stored weights correspond to the weights stored in the zero position matrix; and
updating weights among the stored weights not corresponding to the weights stored in the zero position matrix.

* * * * *